No. 897,938. PATENTED SEPT. 8, 1908.
W. E. SNYDER.
PROCESS FOR THE MANUFACTURE OF CEMENT.
APPLICATION FILED MAR. 11, 1907.
3 SHEETS—SHEET 2.
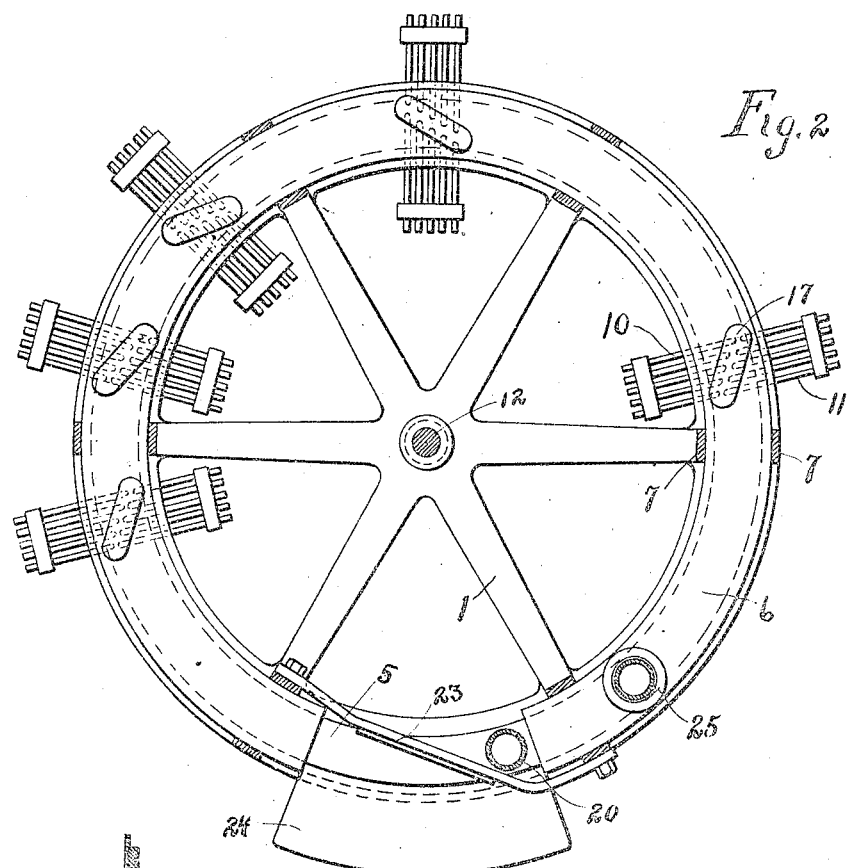
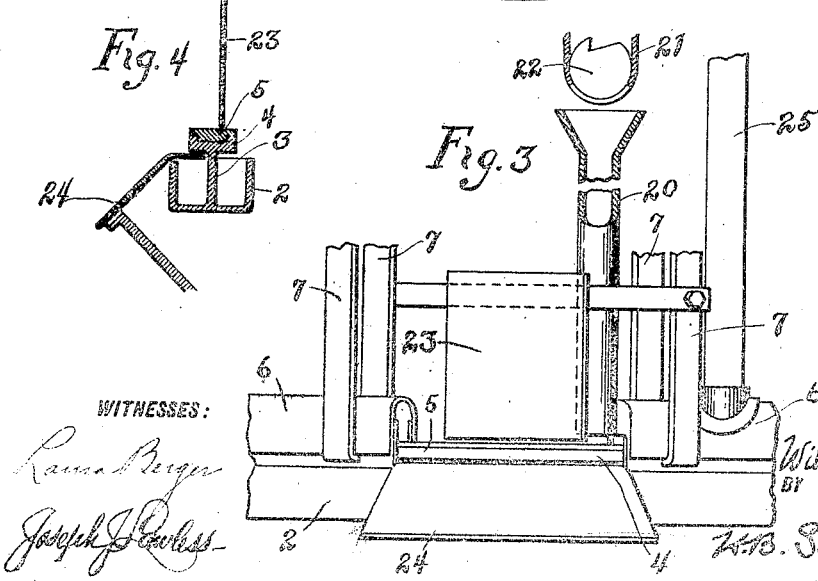

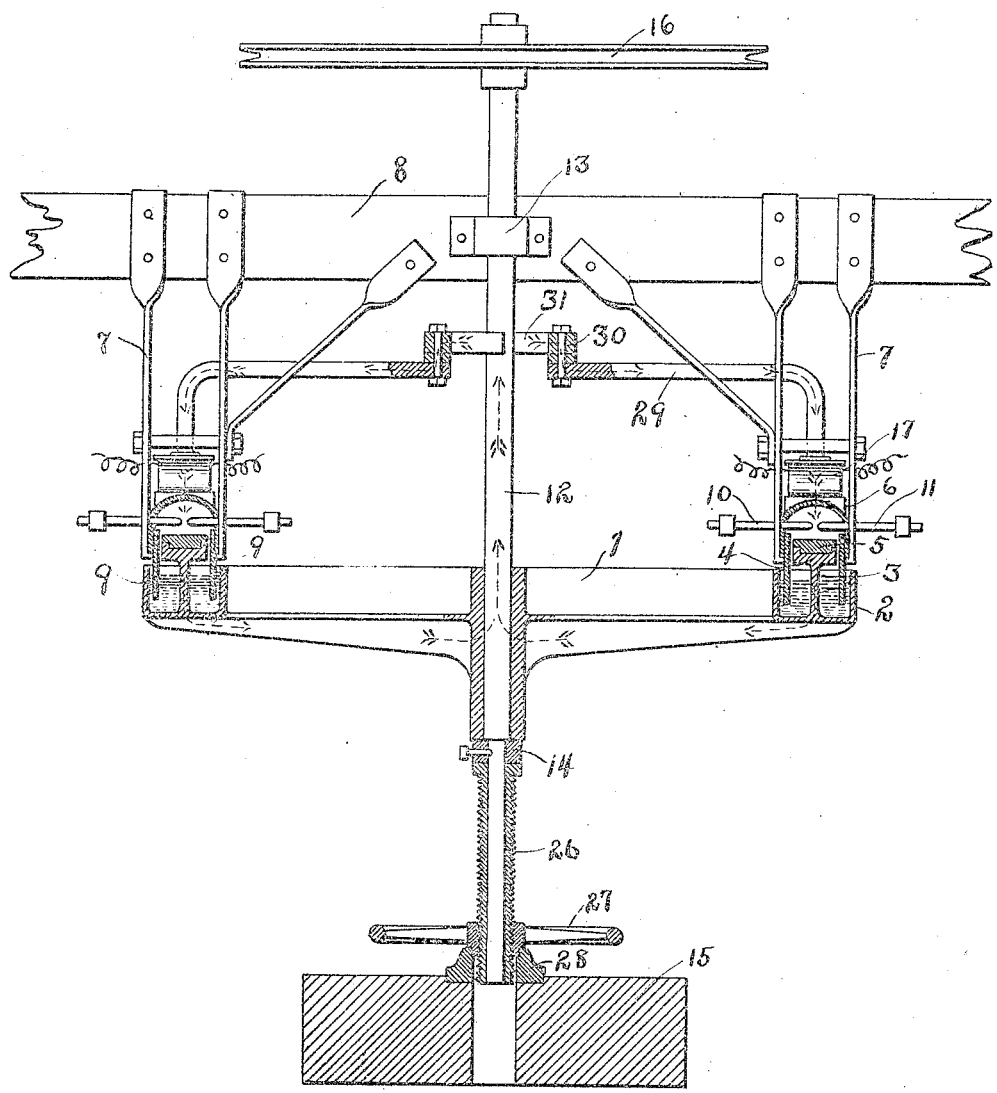

No. 897,938. PATENTED SEPT. 8, 1908.
W. E. SNYDER.
PROCESS FOR THE MANUFACTURE OF CEMENT.
APPLICATION FILED MAR. 11, 1907.
3 SHEETS—SHEET 3.
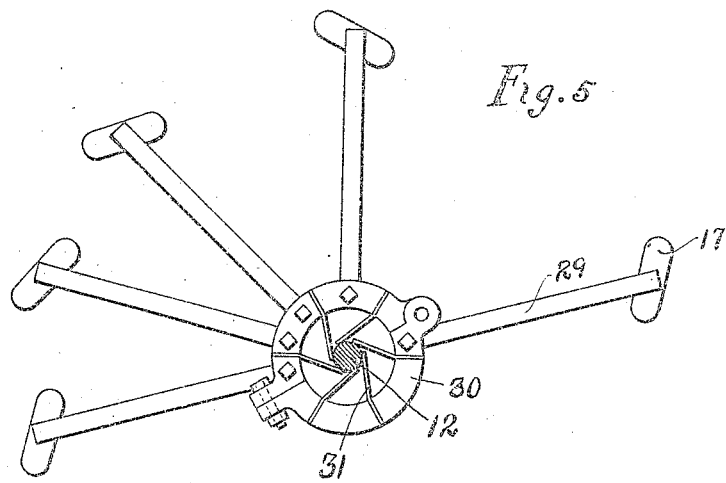
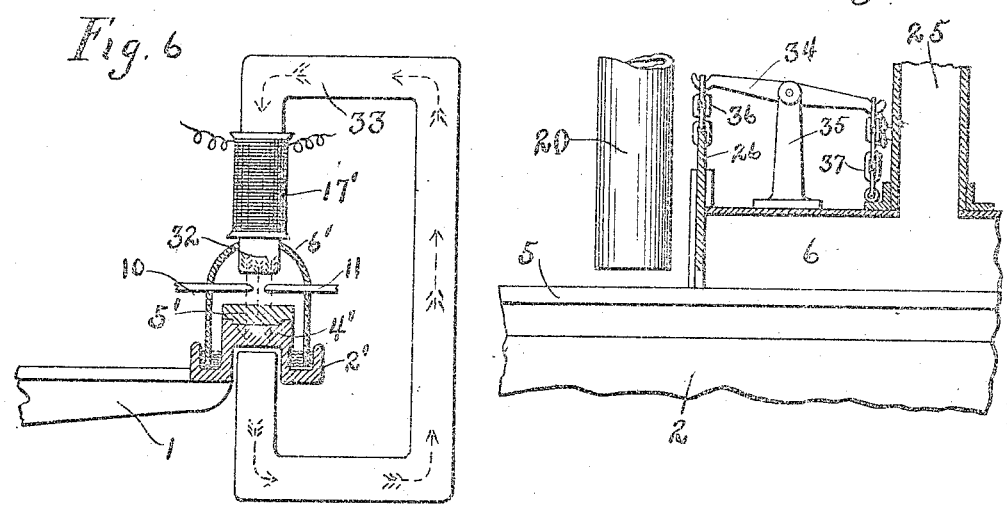
WITNESSES:
INVENTOR
Willoughby Elwood Snyder
BY
W. B. Schermerhorn
ATTORNEY.

UNITED STATES PATENT OFFICE.

WILLOUGHBY ELWOOD SNYDER, OF NAZARETH, PENNSYLVANIA.

PROCESS FOR THE MANUFACTURE OF CEMENT.

No. 897,938.　　　　Specification of Letters Patent.　　Patented Sept. 8, 1908.

Original application filed July 20, 1904, Serial No. 217,317. Divided and this application filed March 11, 1907. Serial No. 361,639.

*To all whom it may concern:*

Be it known that I, WILLOUGHBY ELWOOD SNYDER, a citizen of the United States, residing at Nazareth, in the county of Northampton and State of Pennsylvania, have invented certain new and useful Improvements in Processes for the Manufacture of Cement, of which the following is a specification.

My invention relates to the manufacture of hydraulic and cognate cements, and my object is to provide a process for such manufacture wherein calcination is accomplished through the agency of electricity, and whereby I may avoid—(1) the entry into the cement mixture of coal ash or other products of combustion, (2) the direct action upon, or penetration of, the cement mixture or charge by the electric arc, (3) the cooling of the charge of cement mixture between heats, and (4) the retention of the carbonic acid gas liberated from the mixture during calcination.

In the accompanying drawings: Figure 1 is a view of the furnace in vertical section, omitting the feed and draft-compelling devices, and showing the rotary hearth with the means for actuating the same, the stationary hood, the arc-electrodes, the electromagnets and the means for raising and lowering the hearth relatively to the arc-electrodes. Fig. 2 is a view of the furnace in plan, showing the rotary hearth with its supporting spider, the hood, the arc-electrodes, the electro-magnets, the feed pipe, the stack or draft-compelling means, the scraper and the apron therefor. Fig. 3 is a detail view in side elevation, partly in vertical section and partly in perspective, of the hearth and hood at the point of charge and discharge, showing the feed pipe, the stack, the scraper and the apron. Fig. 4 is a detail view in cross-section, of the hearth showing the scraper and the apron. Fig. 5 is a detail view, in plan, of the means for establishing electrical connection between the electro-magnets and the power shaft, as shown in Fig. 1. Fig. 6 is a detail view, in elevation, showing an alternative arrangement of the electro-magnets. Fig. 7 is a detail view, in elevation, of the shutter or slide at the charging end of the hood, showing the means for raising and lowering the shutter.

Referring to the numerals on the drawings, I shall first proceed to describe the apparatus illustrated therein, with special reference to its availability for the practice of my process or method of manufacture, and, having done so, shall by the aid afforded in the knowledge of the apparatus, endeavor briefly but clearly to trace the several steps of my process.

In Fig. 1 the spider or spoked wheel 1 carries the annular reservoir 2 from the bottom of which rises the vertical support 3 carrying the continuous annular hearth 4 with its top 5 composed of fire-brick or other suitable heat-resisting material. The vertical support 3 of the hearth thus divides the reservoir 2 into two continuous annular U-shaped compartments. The hood 6, composed of any suitable refractory or heat resisting material is suspended over the hearth by the straps 7 depending from the frame 8. To the inner sides of the hood are secured the plates 9 which extend downward into the U-shaped compartments of the reservoir 2 above described. The hood 6 and its plates 9 are continuous save at the point of charge and discharge shown in Fig. 2 and hereinafter described, and the space included by the hood above the hearth should be such as to produce the necessary reverberatory action of the heat of the arcs, hereinafter described, located within the hood above the hearth against the charge thereon.

At intervals in the hood 6 openings in the opposite sides thereof are formed, as shown in Figs. 1 and 2, for the introduction of arc-supporting electrodes or carbons, the positive carbons being indicated by the numeral 10 and the negative by the numeral 11. The positive and negative carbons are arranged in sets respectively, as shown in Fig. 2, and are staggered in such wise as to lay an arc across the entire width of the hearth. Each set of positive electrodes is provided with any suitable well-known mechanism (not shown) for automatically advancing or feeding the carbons to preserve an arc of the requisite constancy of energy. For this purpose the mechanism shown and described in Letters Patent No. 816,753, dated April 3, 1906, granted to me for cement burning furnace may be employed. The hearth 4 with its spider 1 is rotated by the vertical shaft 12 mounted in the bearing 13 in the frame 8 and upon the shoulder on the bearing 14 of the threaded sleeve hereinafter described. The pulley wheel 16 indicates any suitable means for rotating the shaft, spider and hearth. Upon the hood 6 are located the electro-magnets 17. These communicate with the shaft 12, Fig. 1, by means of the arms 29, one end of each arm being secured to an electro-magnet and the other end being secured to the split ring 30 surrounding the shaft 12. Electrical connection with the shaft 12 is secured by the brushes 31 carried by the ring 30, as shown in plan in Fig. 5. Thus, referring to Fig. 1, the current passes from the electro-magnets 17 downward through the hood and hearth, is thence conducted through the arms of the spider or spoked wheel 1 to the shaft 12, ascends the shaft 12 to the brushes 31 and thence, through the ring 30 and arms 29 back to the electro-magnets 17. The course of the current is indicated by the dotted arrows in Fig. 1. The function of the electro-magnets above described is to intensify the calcining action of the arcs generated between the carbon points hereinabove described.

The means for feeding the cement or other material upon the hearth are indicated in Fig. 2 and shown in detail in Fig. 3. It consists of the feed pipe 20 opening directly upon the hearth at the charging end of the hood, the casing 21 forming the lower end of a suitable bin or hopper containing the material to be calcined, and the notched feed cylinder 22 adapted to rotate in the casing 21. By the rotation of the feed cylinder 22 by any suitable mechanism (not shown) an intermittent feed of the material is obtained from the hopper and casing 21 into the upper end of the feed pipe 20 whence it is deposited upon the hearth at the charging end of the hood. An intermittent deposit upon the hearth of the material to be calcined is desirable for the reason that a continuous charge or deposit becoming vitrified into a more or less solid and continuous mass might tend to become blocked or jammed within the hood, particularly at the exit or discharge end thereof where the vitrified or calcined product is turned off the hearth by the scraper 23 hereinafter described.

In Fig. 2 the hood 6 is seen to be continuous save for the space between its charging and discharge ends. In this space is arranged the scraper 23, disposed diagonally across the hearth and secured either to the ends of the hood or to the straps supporting the same, as shown in Figs. 2 and 3. To prevent any portion of the calcined product from dropping into the reservoir 2 at this point as it is scraped or diverted from the hearth the stationary apron 24 is secured either to the ends of the hood or otherwise supported, as shown in Fig. 4, the lip of the apron extending partly beneath the hearth in such wise that the calcined product removed from the hearth by the action of the scraper is discharged over the apron without danger of blocking up the reservoir.
In Figs. 2 and 3 the stack 25 represents any suitable draft-compelling means. It communicates with the hood near the charging or feed end thereof and is designed to be provided with a fan or blower (not shown) of any well known form to create an up-draft in the stack. The inlet or charging end of the hood is closed by the curtain or slide 26 Fig. 7, which allows of an opening between its lower edge and the surface of the hearth sufficient to permit the material fed thereon by the pipe 20 to enter the hood. The exit or discharge end of the hood is open. Thus the up-draft created in the stack 25 by the blower or fan causes a current of air to be drawn in at the discharge end of the hood and to circulate through the latter against the direction of revolution of the hearth and of the material deposited thereon. Each of the annular U-shaped compartments of the reservoir 2, Fig. 1, is partially filled with any suitable fluid, such as a heavy oil and the plates 9 extending down from each side of the hood into said liquid render the hood continuously air-tight save at the charging and discharge ends thereof. Thus no air is drawn in under the edges of the hood to interfere with the circulation above described. This arrangement of parts serves the further purpose of conserving as far as possible the heat within the hood.

In the use of my furnace as embodying my process for the calcination of cement or other cognate materials it may become desirable or necessary to employ different degrees of heat for the treatment of different substances or of the same substance. This adjustment I secure by the means shown in Fig. 1. The lower end of the vertical shaft 12 is provided with a threaded sleeve 26 set-screwed thereto and controlled by the wheel 27 mounted upon the bearing 28. By rotating the wheel 27 the shaft 12 may be lowered, an opening in the base 15 being provided for the purpose. This lowers the hearth, increasing the space between the charges thereon and the carbon points above and likewise increasing the volume of air drawn through the hood by the draft-compelling means. The depth of the reservoir 2 and of the plates 9 extending down into the same may be proportioned in practice to admit of adjustment in the manner above described within any desired limits.

By reference to Fig. 2 it will be observed that the sets of electrodes with their accompanying electro-magnets are disposed at unequal distances around the hearth and hood. The object of this disposition is as follows: If the material to be calcined is immediately and continuously subjected to the full calcining action of the electrodes from the moment it enters the charging end of the hood it may be overburned and the product thus may be deteriorated. By the arrangement shown in Fig. 2 the material entering the charging end of the hood is subjected only to the reverberatory heat of the hood and hearth, which is least at the point of entrance and increases as the hearth with its charge approaches the first set of electrodes. The distance between the first set of electrodes and each succeeding set progressively diminishes, thus increasing both the direct and reverberatory heat to which the charge is subjected in its circulation through the hood from the charging end to the discharge end.

In Fig. 6 I have indicated an alternative arrangement of parts to secure the electromagnetic reinforcement of the calcining action of the carbons. In this arrangement the spider 1 carries the annular reservoir 2¹ and the hearth 4¹ with its fire brick covering 5¹. Air tightness at the sides of the hood 6¹ is secured by an extension of the sides thereof into the reservoir. The disposition of the carbons 10 and 11 is as hereinbefore described. The electro-magnet 17¹ is located, as before, above the hood and is provided with the head 32 which projects downward through the top of the hood as shown. The bent arm 33 passes from the electro-magnet 17¹ outward, downward and upward to a point immediately below the hearth, providing a means whereby a continuous circulation of the electro-magnetic current may be obtained for the purpose of reinforcing the action of the carbons, as hereinbefore described.

In Fig. 7 is shown a means for adjusting the shutter 26 at any desired height and thus partly closing the charging end of the hood. To one end of the arm 34, pivoted upon the support 35, is hooked the chain 36 attached to the top of the shutter, and the chain 37, one end of which is secured to the top of the hood, is hooked to the other end of the arm.

Having set forth in detail the component parts of my invention I shall now describe the principle of my furnace together with its mode of operation. In the first place, I avoid actual penetration of a charge or mass of cement mixture to be treated by the arcs or any part of the arcs, which may prevent the manufacture of a sound cement. I employ the heat derived only by radiation, deflection or reverberation of the arcs. The arcs must be located a sufficient distance above the hearth to accommodate upon the hearth a charge disposed below, but not between the electrodes that sustain the arc, it being well understood that the heat of an arc is most intense and that the highest degree of its intensity is located directly within the current of or between the electrodes supporting the arc, where, as has been specified, it is, if not too intense, at least too much concentrated for its successful employment in the manufacture of cement. It is the object of my invention in part to employ such heat, free, as it is, from products of combustion deleterious to cement at its highest efficient intensity, but without its objectionable degree or manner of concentration above referred to. To that end, locating a mass of cement mixture to be treated or charged out of the line of penetration by the arcs I provide for the full utilization of the available heat of the arcs through the reverberatory action of the hood above the arcs, which reverberatory action, together with the direct radiation from the arcs, is directed, deflected, and concentrated in efficient energy against the charge upon the hearth. In order to provide for the continuous manufacture of cement upon a hooded hearth of annular form, it is necessary, in view of the fact that the immediate product of calcination in the manufacture of cement is a clinker or vitrified mass to deposit cement mixture in separate charges upon the hearth, because when so deposited they clinker into detached portions or cakes which may, through the continuous rotation of the hearth, be automatically swept therefrom one by one by the scraper. Further, an advantage is derived over a continuous charging feed, in securing to the charge that perfect homogeneity of calcination which is essential to the manufacture of a sound cement. Finally, it is advantageous to the practical application of heat over an extended charge or mass to be calcined in the manufacture of cement but more especially in the application of successive heats to separate charges, not only to make provision for the application of an abundant supply of oxygen to the charge while it is undergoing calcination, but also with especial reference to the several stages which it undergoes between initial and complete calcination. To explain more fully, the initial application of heat to a charge of cement mixture besides expelling moisture liberates carbonic-acid gas in quantity. Consequently in order to promote combustion it is not only necessary to keep a constant supply of oxygen at the point of combustion, but also to draw off the carbonic-acid gas and other impurities or deleterious products generated by the combustion. If, therefore, suitable draft-compelling means be provided and properly applied in the manufacture, it will serve a double purpose, both of affording a fresh supply of oxygen and of removing injurious products of combustion. Consequently I provide, by means of the stack communicating with the charging end of the hood, for the generation of a current of air in opposition to the direction of movement of the hearth. This provides pure air to the final combustion and conducts the current by successive stages to the point of initial combustion, whence the dense fumes generated by such initial combustion are conducted off through the stack, without possibility of contamination of the finished product.

My present process application is a division of my application for cement-burning furnace, filed July 20, 1904, Serial No. 217,317 upon which Letters Patent were issued to me, dated April 3rd, 1906, No. 816,753. The furnace therein described is adapted for the practice of my process, but I consider the furnace described in this present application as exemplifying a preferable form of apparatus for the practice of my process.

What I claim is:—

1. In the manufacture of cement, the process of calcination which consists in subjecting material suitable therefor to a series of electrically generated heats and in the employment therewith of an air current through the successive heats from the final to the initial heat.

2. In the manufacture of cement, the process of calcination which consists in exhibiting a charge upon a movable hearth to the action of successive electrically generated heats, and in generating against the charge a current of air proceeding from the final to the initial heat and moving in opposition to the direction of movement of the hearth.

3. In the manufacture of cement, the process of calcination which consists in subjecting material suitable therefor upon a movable hearth to a series of reverberatory heats generated respectively from a series of electric arcs and in the employment therewith of a current of air proceeding from the final to the initial heat and moving in opposition to the direction of movement of the hearth.

4. In the manufacture of cement, the process of calcination which consists in intermittently feeding the material to be calcined in separate charges upon a movable hearth and subjecting said charges to the reverberatory heat of a series of electric arcs located within a current of air moving in opposition to the direction of movement of the hearth.

In testimony whereof I hereto affix my signature in presence of two witnesses.

WILLOUGHBY ELWOOD SNYDER.

Witnesses:
WILSON E. BECK,
MATTIE M. WOODRING.